(12) United States Patent
Mizoguchi (10) Patent No.: US 6,337,750 B1
(45) Date of Patent: *Jan. 8, 2002

(54) IMAGE READING SYSTEM

(75) Inventor: Shigeru Mizoguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,356

(22) Filed: Dec. 3, 1996

(30) Foreign Application Priority Data

Dec. 7, 1995 (JP) ............................................. 7-319285

(51) Int. Cl.⁷ ................................................. H04N 1/04
(52) U.S. Cl. ........................ 358/475; 358/401; 358/474
(58) Field of Search .................................. 358/474, 475, 358/509, 505, 486, 497, 412, 413, 401, 501, 502, 503; 348/222, 241, 260, 261, 269; 362/800

(56) References Cited

U.S. PATENT DOCUMENTS

| 4,731,661 | A | * | 3/1988 | Nagano ....................... 358/509 |
| 4,890,212 | A | * | 12/1989 | Kumon et al. ................ 307/29 |
| 5,313,289 | A | * | 5/1994 | Nagane et al. .............. 358/475 |
| 5,367,223 | A | * | 11/1994 | Eccher ....................... 358/475 |

FOREIGN PATENT DOCUMENTS

JP          3-220972          9/1991

* cited by examiner

*Primary Examiner*—Cheukfan Lee
(74) *Attorney, Agent, or Firm*—Fitzpatrick, Cella, Harper & Scinto (57) ABSTRACT

A scanner is detachably mounted on a built-in printer of a note personal computer. Since the light amount or wavelength of an LED for illuminating an original arranged in the optical system of the scanner becomes unstable during the rise time immediately after the ON operation of the LED, a control processing unit inhibits the reading operation of the original using a CCD for 60 sec after the ON operation. After the LED has reached a stable state, a current lower than that required upon reading is supplied to the LED to maintain the stable state while no reading operation is performed.

88 Claims, 10 Drawing Sheets

IMAGE READING SYSTEM

BACKGROUND OF THE INVENTION

1. Field of the Invention

The present invention relates to an image reading system for reading an original image in, e.g., an image scanner, a facsimile apparatus, and the like and, more particularly, to an image reading system suitably used in an original reading apparatus which illuminates an original using a linear light source comprising an LED (light-emitting diode) array and senses the linear image using a CCD (charge coupled device) one-dimensional image sensor.

2. Related Background Art

Figure 12:
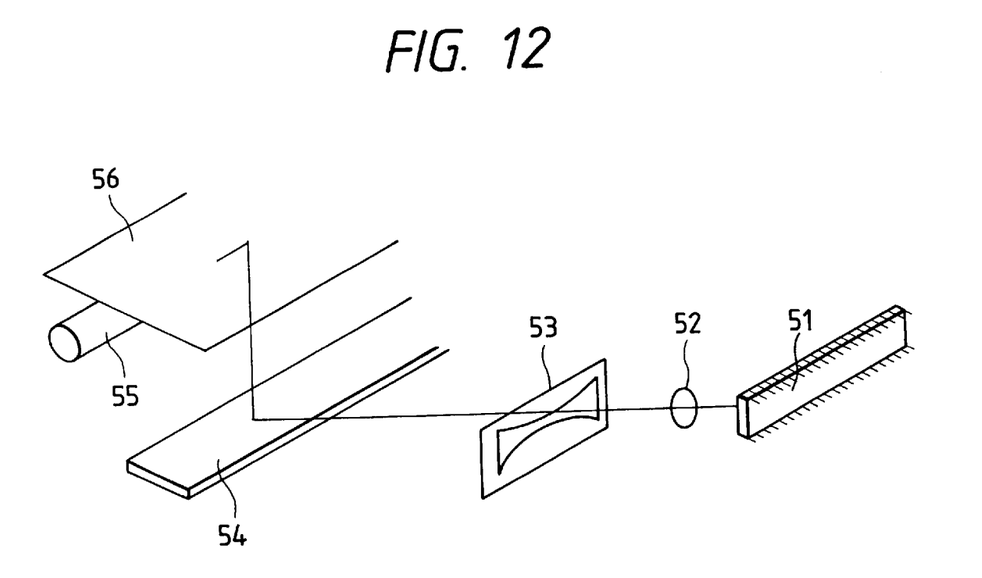
FIG. 12 is a schematic view showing the principle of a conventional image reading apparatus.

As a conventional image reading apparatus used in, e.g., a scanner, a facsimile apparatus, and the like, an apparatus using a reduction optical system, as shown in FIG. 12, is known.

This apparatus comprises a light source 55 which extends in the longitudinal direction to illuminate an original 56, a mirror 54 for bending the optical path to make the entire apparatus compact, a lens 52 for imaging original information light, a correction plate (shading plate) 53 for correcting the lens cosine rule of the white output waveform, and a line CCD image sensing element (to be referred to as a CCD hereinafter) 51 for converting optical information into an electrical signal. The apparatus also comprises an IC (not shown) comprising, e.g., an A/D converter for A/D converting an image signal output from the CCD 51 before the image signal is transferred to an image processing system, and the like.

Such image reading apparatus normally uses an inexpensive Xenon (Xe) lamp, an LED, or the like as the light source to attain a cost reduction of the apparatus.

However, in the conventional apparatus, since the Xe lamp, LED, or the like serving as the light source has a small absolute light amount, the accumulation time for reading of the CCD must be prolonged or the sensitivity of a light-receiving unit must be increased so as to obtain stable image information. Under the circumstances, although development associated with high-speed driving of CCD devices is underway, the light-receiving unit of the CCD for photoelectrically converting optical information of an original has limited sensitivity characteristics, and the original must be irradiated with light in a sufficient amount so as to obtain a stable, high S/N ratio. For this purpose, when the driving current of, e.g., the LED is increased to increase the light amount, the wavelength of light changes due to heat generated by the LED itself, and the current changes due to changes in forward voltage. As a consequence, a stable light amount cannot be obtained.

Conventionally, a note or notebook type personal computer which comprises a printer unit and a scanner unit attached to the printer unit is commercially available. However, it has been desired to simplify the scanner circuit to attain a size reduction of the computer housing.

Furthermore, in a note personal computer that can be driven by a secondary battery, the consumption power is required to be reduced as much as possible.

SUMMARY OF THE INVENTION

It is an object of the present invention to provide an image reading system that can read an image with high image quality.

It is another object of the present invention to provide a compact, energy-saving image reading system.

It is still another object of the present invention to provide an image reading system which can stabilize the illumination characteristics of a light source.

In order to achieve the above object, according an embodiment of the present invention, an image reading apparatus comprises reading means for reading an original, a light source for illuminating the original, power supply means for supplying electric power to the light source, and control means for controlling the power supply means to supply electric power different in quantity from that required upon reading to the light source while the reading means does not read the original.

Furthermore, according to another embodiment of the present invention, a control apparatus comprises power supply means for supplying electric power to a light source of an image reading apparatus having reading means for reading an original and a light source for illuminating the original, and control means for controlling the power supply means to supply electric power different in quantity from that required upon reading to the light source while the reading means does not read the original.

With the above arrangement, high-quality image reading can be attained without wasting consumption power. Also, the illumination characteristics of the light source can be stabilized.

Other objects and features of the present invention will become apparent from the following specification and the accompanying drawings.

BRIEF DESCRIPTION OF THE DRAWINGS

FIG. 10 is a graph showing the CCD output characteristics when the LED is continuously turned on;

DESCRIPTION OF THE PREFERRED EMBODIMENTS

Figure 1:
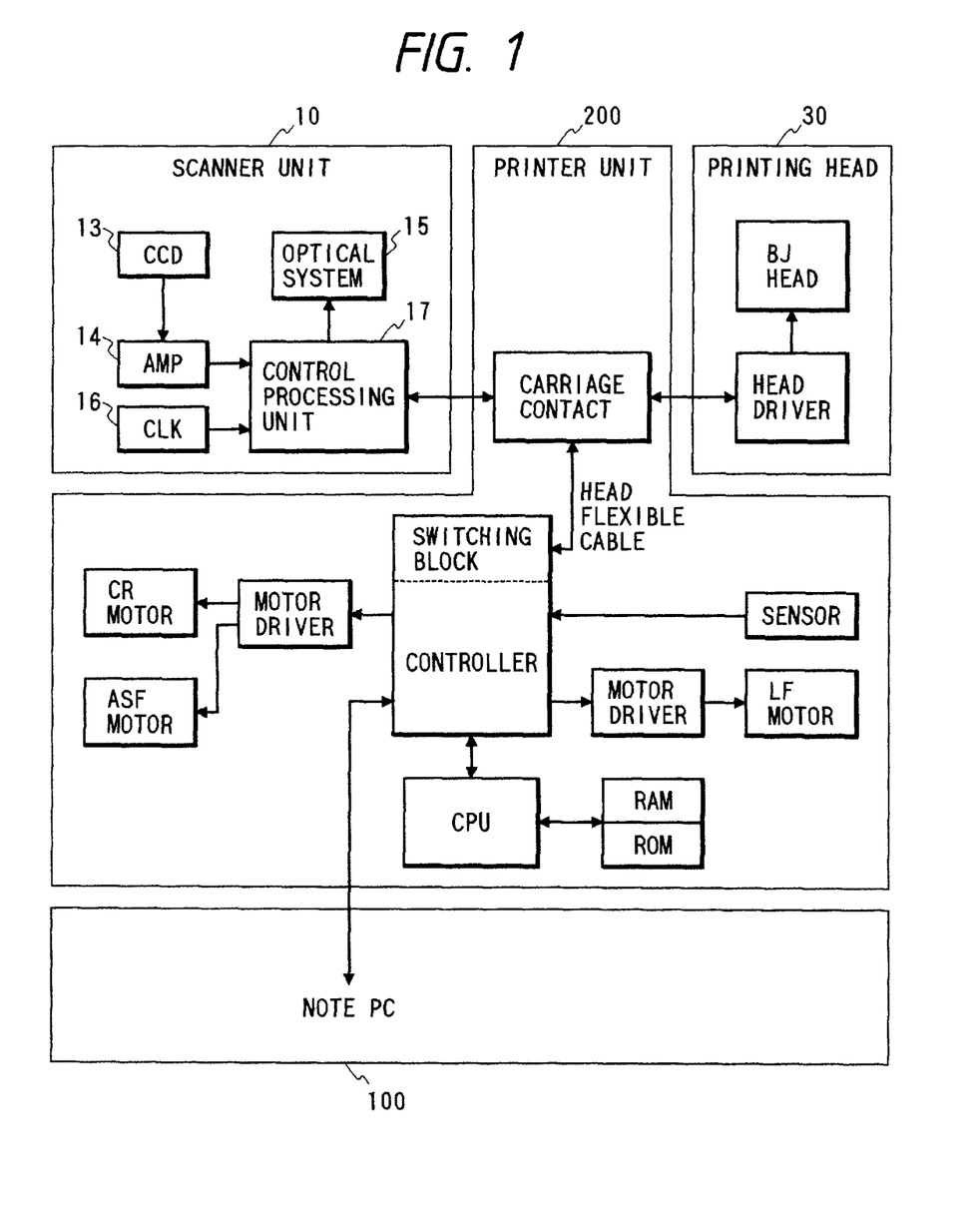
FIG. 1 is a block diagram showing an embodiment of a system to which the present invention is applied.

FIG. 1 shows an embodiment of a system when an image reading apparatus according to the present invention is used in a note personal computer.

Referring to FIG. 1, a printer unit 200 is built in a note personal computer (PC) 100. A scanner unit 10 serving as an image reading apparatus and a printing head 30 are selectively connected to the printer unit 200.

The scanner unit 10 comprises a CCD 13, an amplifier 14 for amplifying the output from the CCD 13, an optical system 15 including a light source for illuminating an original, a clock generation circuit 16, a control processing unit 17 for performing A/D conversion, shading correction, control of the optical system 15, and the like, and so on.

Figure 2:
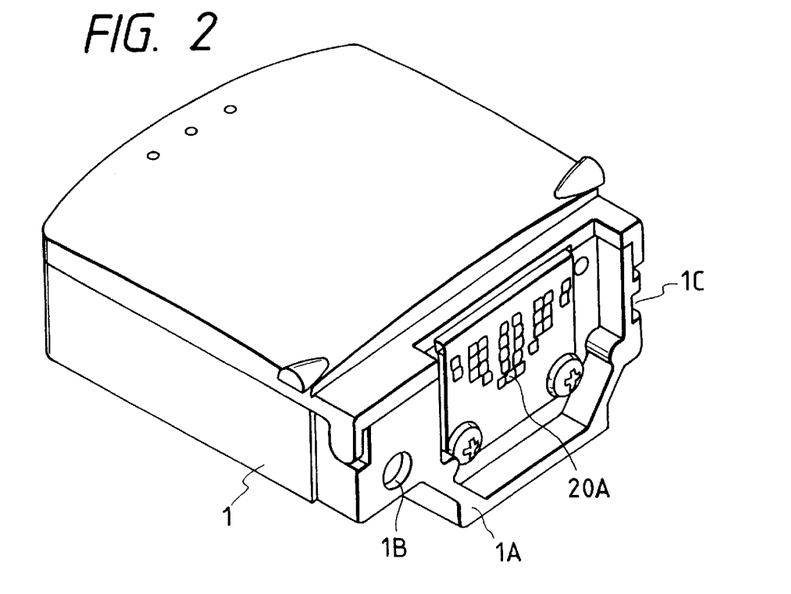
FIG. 2 is a perspective view showing the outer appearance of an embodiment of a scanner unit according to the present invention.

FIG. 2 shows the outer appearance of the scanner unit 10. Referring to FIG. 2, the scanner unit has an alignment hole 1B and an alignment groove 1C, which are used for performing position alignment when the scanner unit is set on a carriage. A reference wall 1 determines the posture in the reading direction, and the mounting position of the scanner unit is determined when the reference wall 1 is biased toward a reference wall (not shown) on the carriage side. A connector portion 20A serves as an internal I/F that attains electrical contacts when the scanner unit is mounted on the printer unit.

Figure 3:
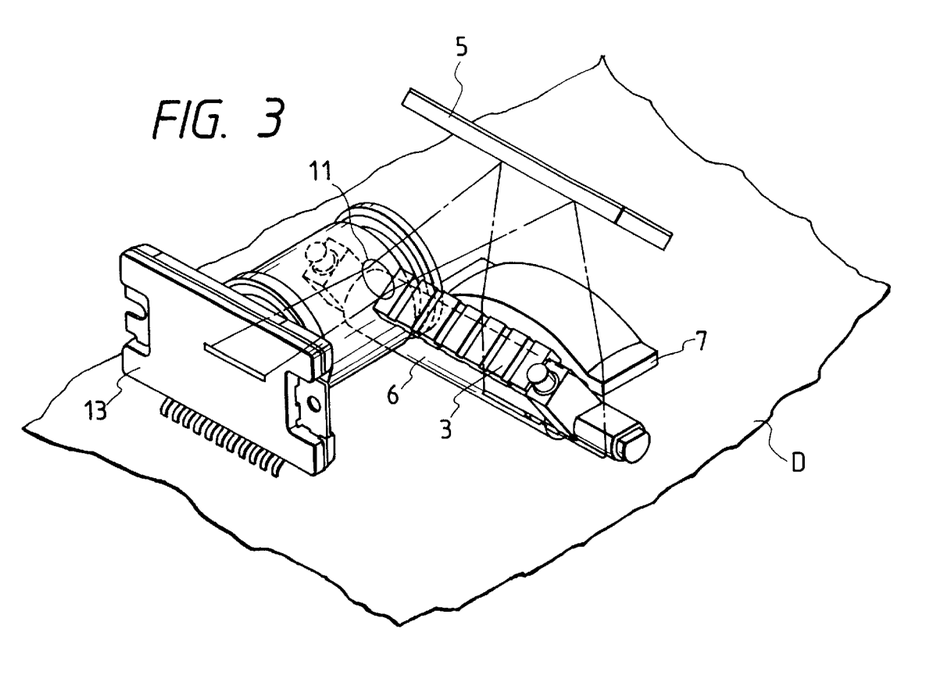
FIG. 3 is a perspective view showing the optical system parts layout of the scanner unit.

FIG. 3 shows the arrangement of the optical system 15. An original D is set at the lower side of the drawing.

Referring to FIG. 3, a plurality of LEDs ($\lambda$=570 nm) 3 serving as the light source are arranged to be longer than the reading width. A cylindrical rod lens 6 serving as a focusing means is arranged in the vicinity of the LEDs 3 to be parallel to the arrangement direction of the LEDs 3. The irradiation center of the LEDs 3 passes through the center of the lens effect surface of the rod lens 6, and obliquely irradiates the original surface.

Light reflected by the original passes through a field lens 7 serving as a first imaging system, the light source center of which is arranged in a direction substantially perpendicular to the original, and the propagation direction of the optical axis is bent by 90° by a mirror 5 elongated in the reading width direction, thus obtaining light rays substantially parallel to the original. The imaging surface of the field lens 7 is set at the position of an aperture 11. An imaging lens (not shown) serving as a second imaging system lens is arranged behind the aperture 11.

The imaging position of the imaging lens matches the position of the photoelectric conversion element (CCD) 13. Note that the imaging system lens is set at a reduction ratio of 0.45158.

In the printer unit 200 shown in FIG. 1, a printer CPU and a controller perform control of three motors (for carriage (CR), line feed (LF), and auto sheet feed (ASF)), control of four sensors (for home position detection, ASF position detection, sheet feed detection, and sheet exhaust detection), and driving control of the scanner unit and the printing head. One of the scanner unit 10 and the printing head 30 can be freely attached/detached to/from the printer unit 200. The scanner unit or the printing head and its joint portion are connected by biasing the respective units upon mounting since contact electrodes are provided to the carriage portion of the printer unit. In this case, as a method of discriminating the mounted unit, each unit has a 2-bit head ID in its carriage contact portion, and after the unit is mounted, the head ID is loaded to discriminate the scanner unit 10 or the printing head 30 so as to change the contents of control pins in correspondence with the discriminated unit.

The attachment state to the printer unit will be described below with reference to FIG. 4.

Figure 4:
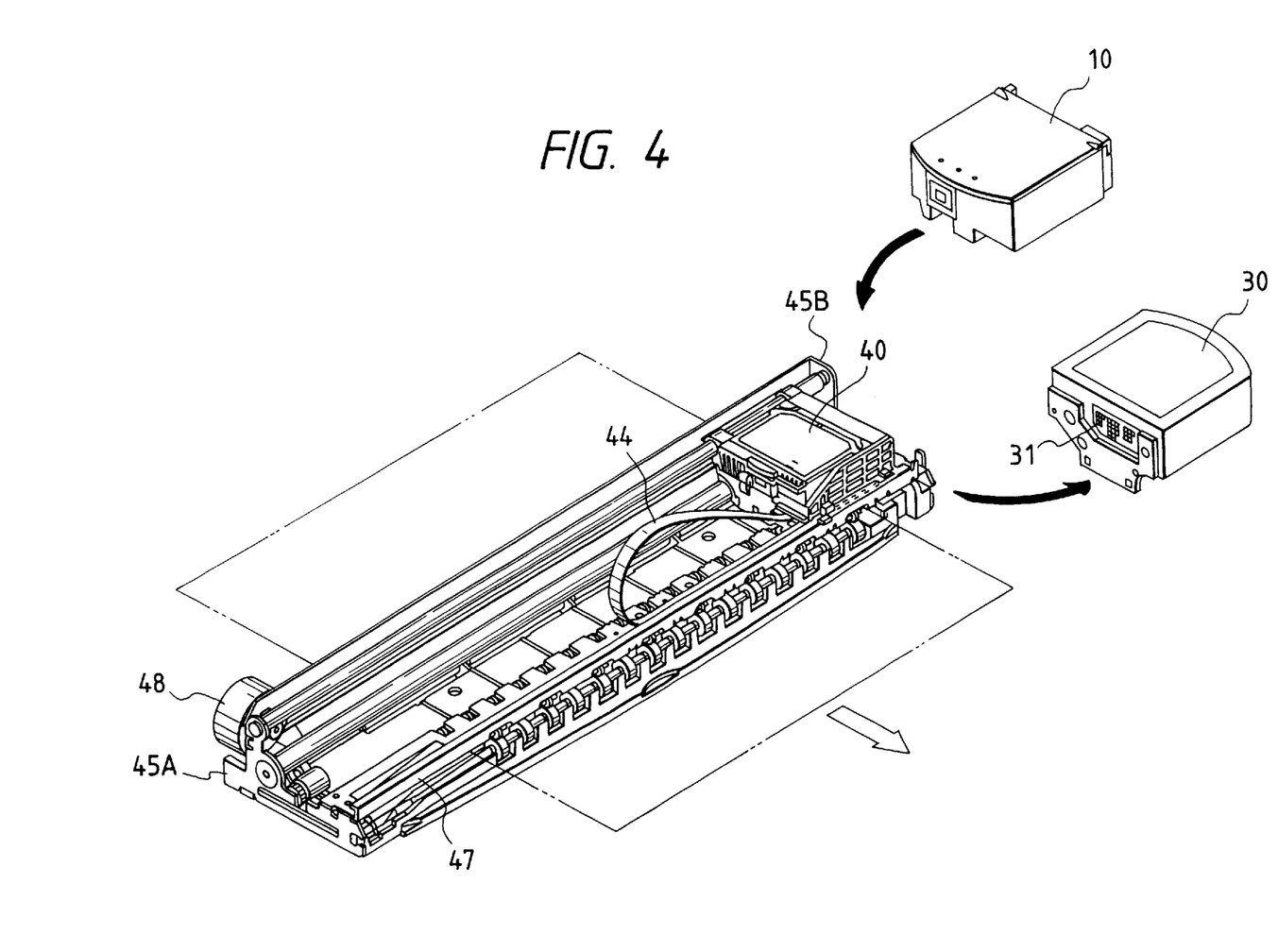
FIG. 4 is a perspective view showing the attachment/detachment state of the scanner unit and a printing head to/from a printer.

The scanner unit 10 has substantially the same shape as that of the printing head 30 used in the printer, and constitutes a cartridge, as shown in FIG. 4. A carriage 40 has a contact portion that transmits/receives a reading signal from the main body via the connector portion of the scanner unit 10. The reading signal from the CCD 13 is processed by the CPU in the printer unit 200 via the contact portion and a flexible cable 44.

The carriage 40 reciprocally moves between side plate portions 45A and 45B of a frame along a slide shaft and a slide plate 47 to attain reading. A driving motor 48 moves the carriage 40 via a belt.

Figure 5:
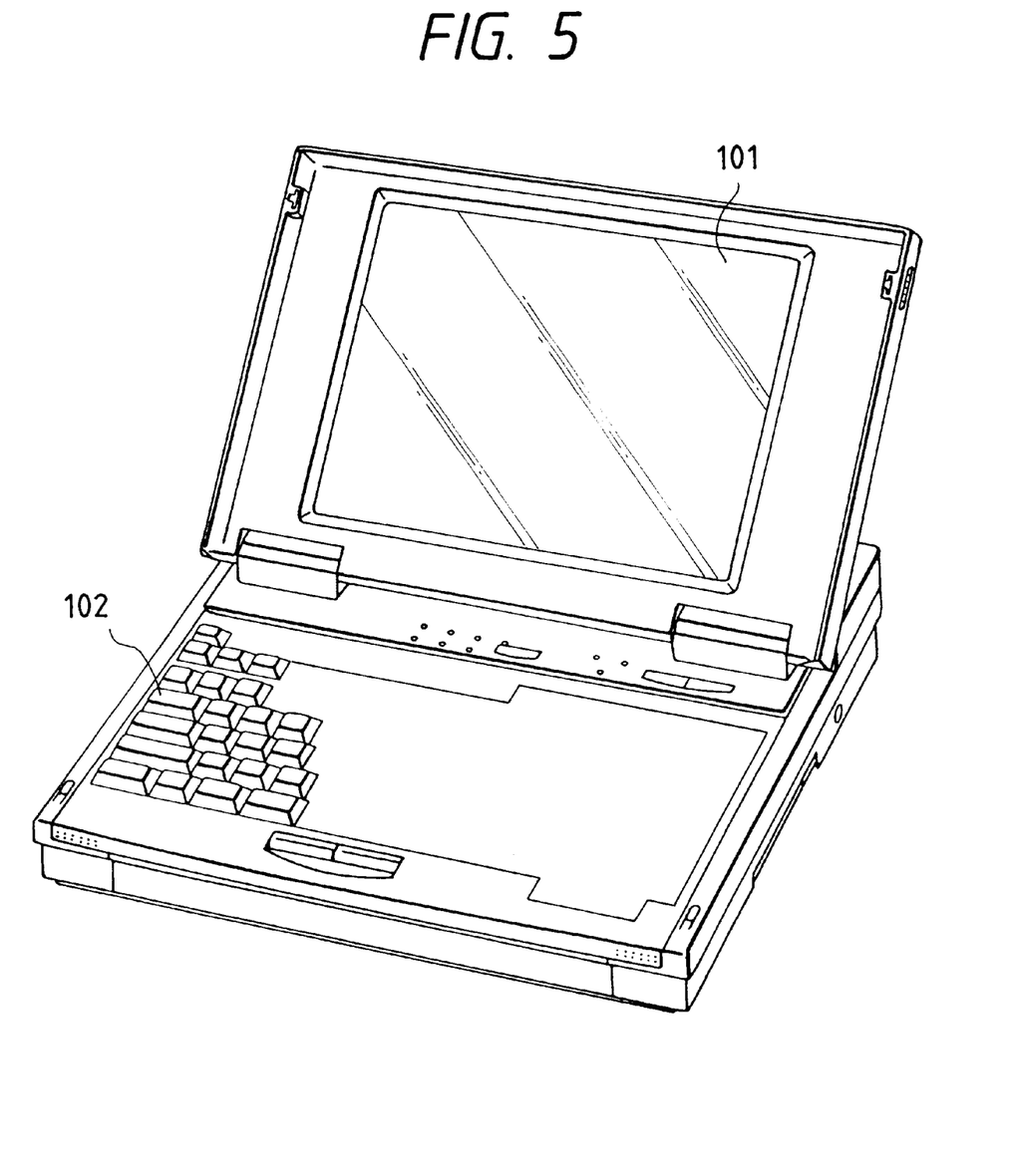
FIG. 5 is a perspective view showing the outer appearance of a note personal computer.

FIG. 5 shows the outer appearance of the note PC 100. A liquid crystal display device 101 is a TFT 11.8" color display, and is free to open/close. A keyboard 102 can be operated when the liquid crystal display device 101 is opened, as shown in FIG. 5. Although not shown, the printer unit is stored in the rear portion of the main body.

Figure 6:
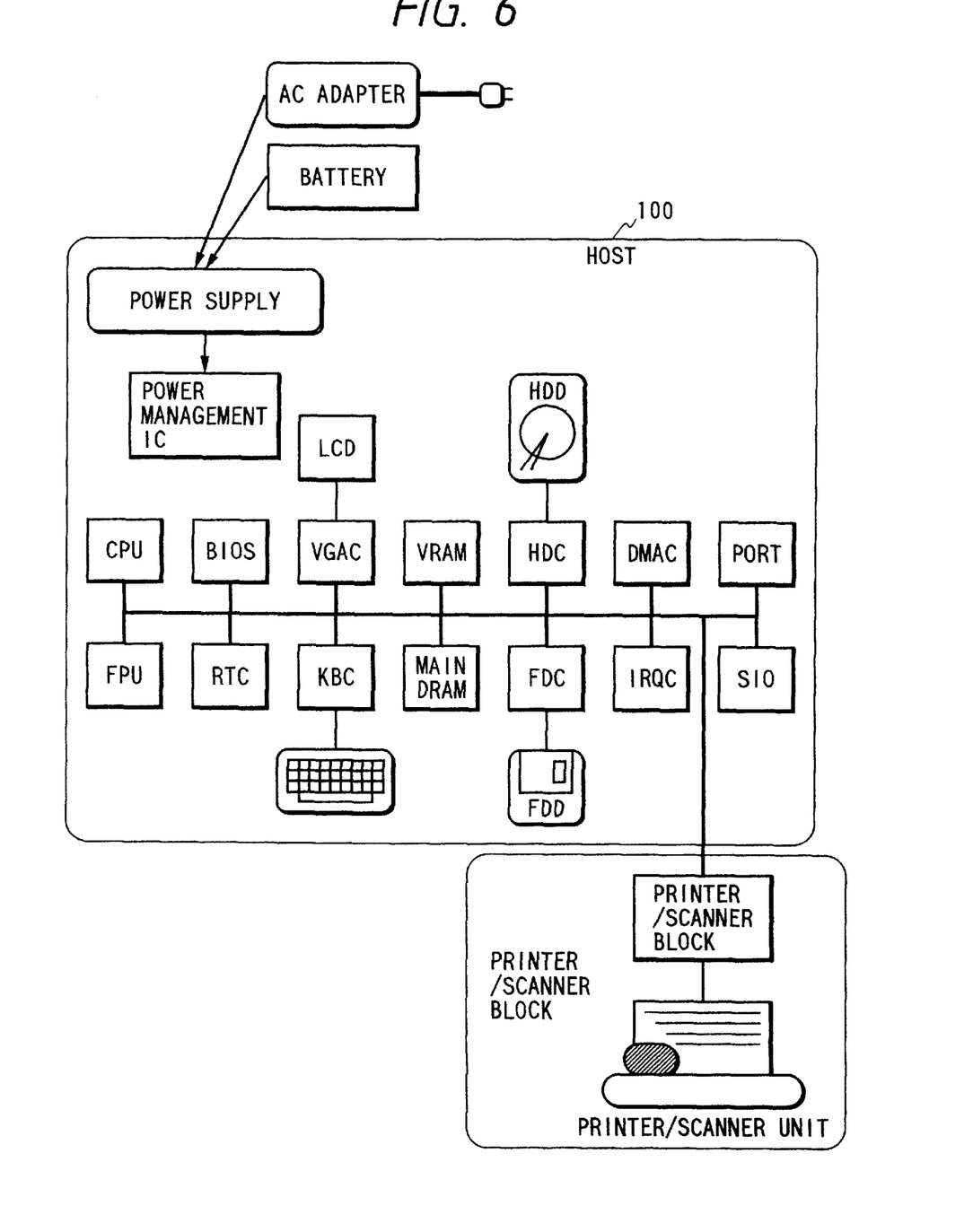
FIG. 6 is a block diagram of the note personal computer.

FIG. 6 is a block diagram of the note PC 100. As a driving source, an AC adapter (rated voltage=20 [V], 54 [W]) and a nickel hydrogen secondary battery (rated voltage=12 [V], 2,700 [mA/h]) are available. The PC 100 has, as its built-in functions, peripheral device controllers such as a floppy disk controller (FDC), a hard disk controller (HDC), a keyboard controller (KBC), a VGA controller (VGAC), and the like. Furthermore, the PC 100 is connected to the built-in printer unit via an internal bus.

The electrical characteristics of the LEDs 3 serving as the light source will be explained below with reference to FIGS. 7 and 8.

Figure 7:
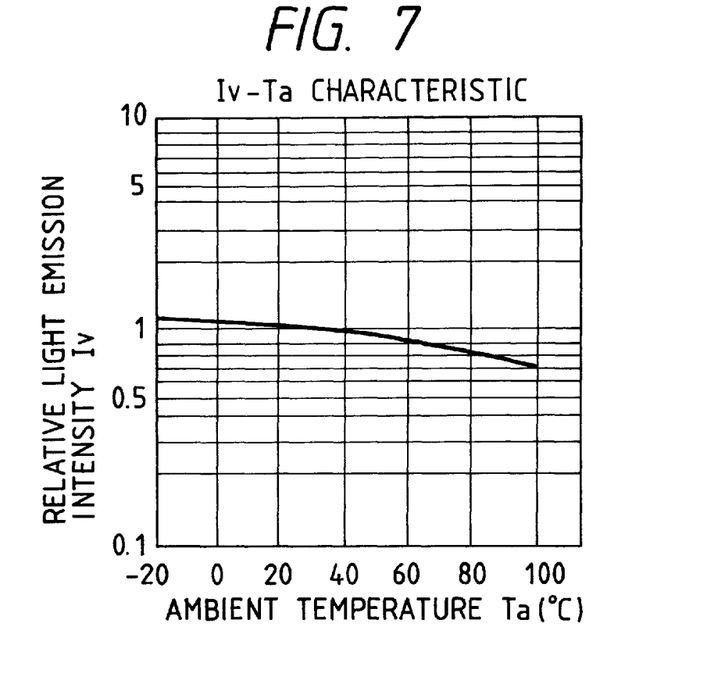
FIG. 7 is a graph showing the relative light emission intensity-temperature characteristics of an LED.

FIG. 7 is a graph showing the relationship between the ambient temperature (Ta) and the relative light emission intensity (Iv). As can be seen from FIG. 7, as the ambient temperature rises, the light emission intensity of the LEDs lowers.

Figure 8:
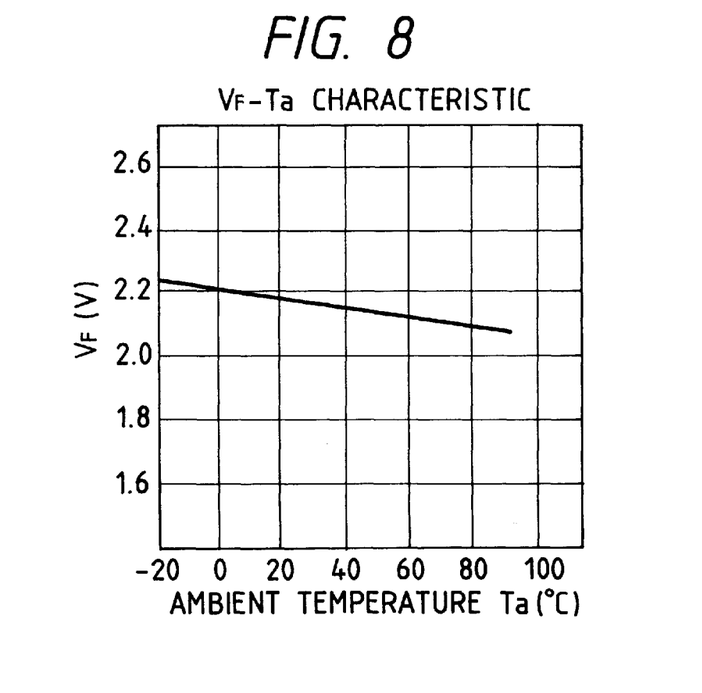
FIG. 8 is a graph showing the voltage-temperature characteristics of the LED.

FIG. 8 is a graph showing the relationship between the ambient temperature (Ta) and the forward voltage. As can be seen from FIG. 8, as the ambient temperature rises, the forward voltage of the LEDs falls.

Figure 9:
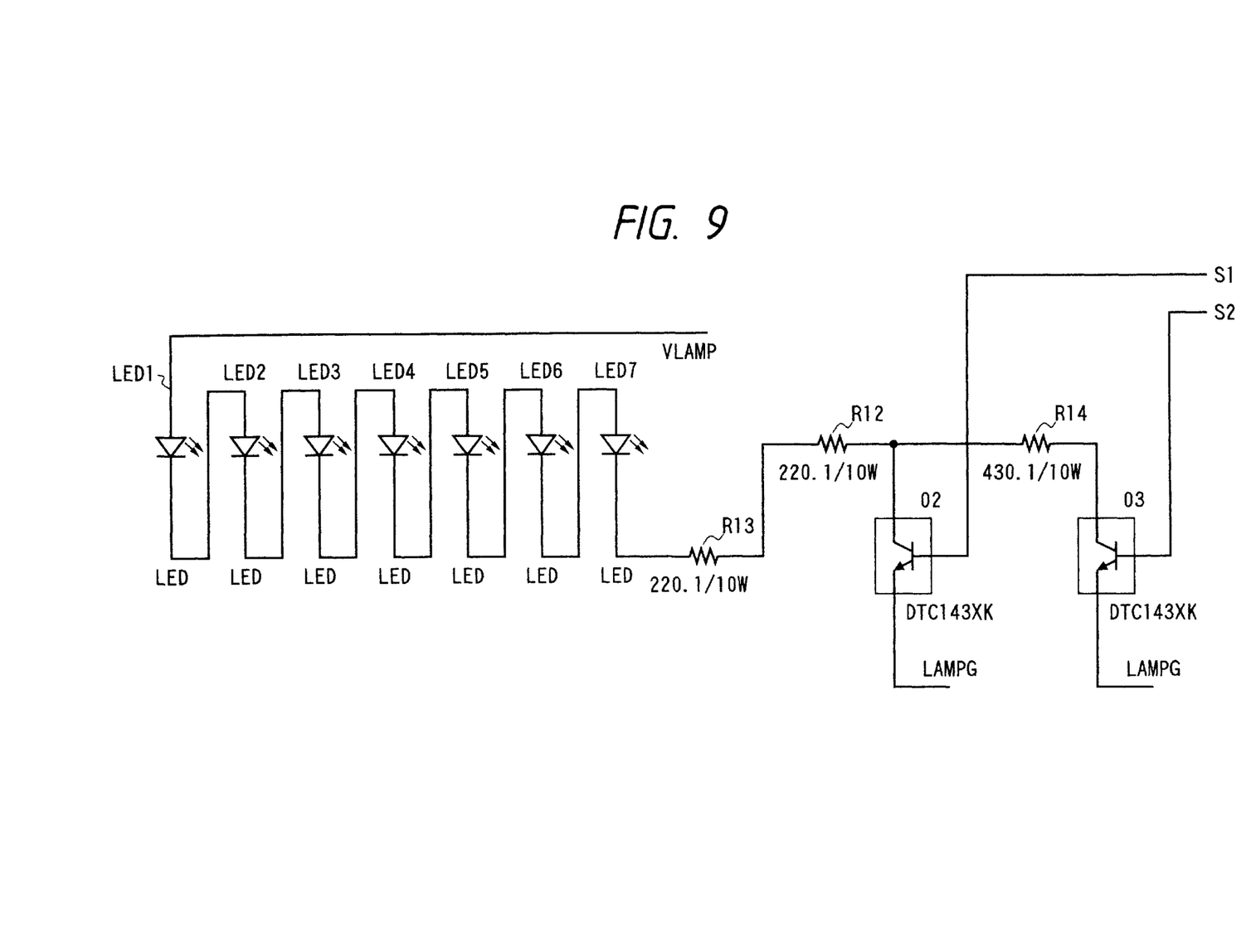
FIG. 9 is a circuit diagram of an LED driving circuit.

FIG. 9 shows an LED driving circuit. In order to house components in a compact body, the circuit must be simplified, and adopts a constant voltage driving system. As the LEDs serving as the light source, seven LEDs, i.e., LED1 to LED7 are arranged in series with each other, and each LED current can be switched in two steps. The current switching control is attached by switching transistors 02 and 03 by signals S1 and S2. When the signal S1 is "High" and the signal S2 is "Low", a high current (about 20 [mA]) flows; when the signal S1 is "Low" and the signal S2 is "High", a low current (about 10 [mA]) flows.

Figure 10:
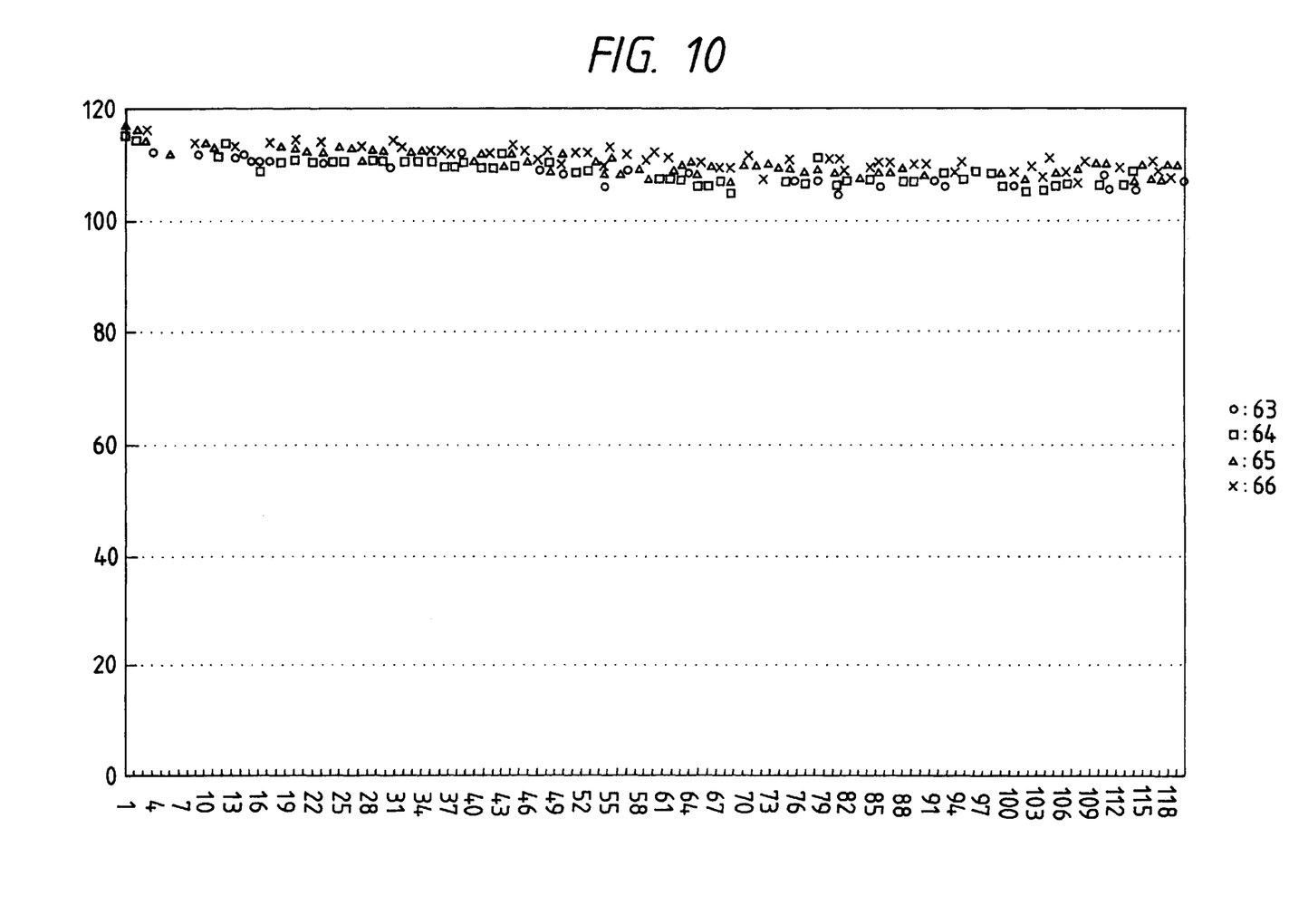

FIG. 10 shows data obtained when a white reference sheet fed from the printer unit 200 is continuously read using the scanner unit 10 while setting the accumulation time to be 256 [$\mu$sec] and the LED high current state (S1="High", S2="Low", 20 [mA]). The abscissa plots the time (unit: seconds) elapsed after the LEDs of the light source are turned on. The ordinate plots the numerical value received by the printer unit when the CCD output from the scanner is expressed in 256 steps. The scanner unit of this embodiment has a reading width of 128 pixels, but data of the 63rd to 66th central portion pixels are adopted as representative values.

The relative light emission intensity of the LED lowers as the LED generates heat after it is turned on. Changes in relative light emission intensity are not proportional to the time elapsed, and as can be seen from FIG. 10, abrupt changes take place immediately after light emission starts.

In consideration of the reading operation by the scanner unit, the LEDs selectively emit light based on a high current (20 [mA]) when the accumulation time is 256 [$\mu$sec] depending on the reading resolution during reading.

However, during the return operation of the carriage to its home position, the ON operation of the LEDs is inhibited since it is required to suppress the consumption power in the main body and the LEDs. In this state, the temperature condition that causes temperature saturation of the LEDs is the most stable state in terms of temperature. The white reference reading value in this state is "110".

As can be seen from the data shown in FIG. 10, the output value reaches "110" corresponding to the stable state about 60 [sec] after light emission starts at an LED current of 20 [mA].

On the other hand, since the speed of the reciprocal operation of the carriage is 3.9 kHz (651 PPS), the average consumption current upon reading operation of the LEDs is 10 [mA].

In order to maintain this state during the interval after the original reading stable state until the next reading operation starts, the LEDs must consume a current equivalent to that in the reading state. Since this current is 10 [mA] in this case, a low current (S1"Low", S2="High") must be supplied to the LEDs. In this embodiment, the value of the current to be supplied to the LEDs is switched. Alternatively, an average current of 10 [mA] may be obtained by intermittently supplying a current to the LEDs in the low current state.

Figure 11:
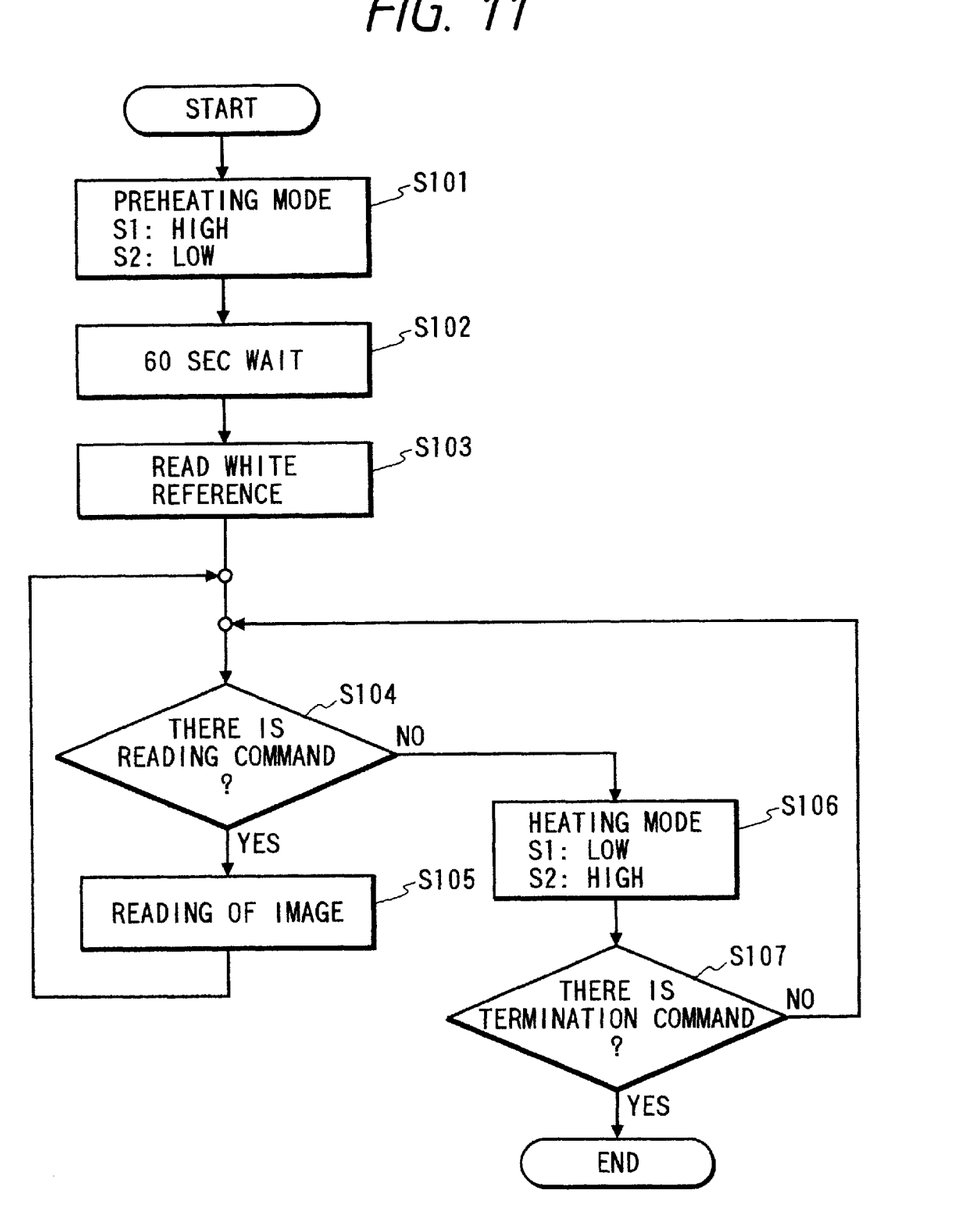
FIG. 11 is a flow chart showing the control operation.

FIG. 11 is a flow chart that attains the above-mentioned control.

Referring to FIG. 11, the high current is supplied to the LEDs 3 in step S101 to set them in the preheating mode. After the control waits for an elapse of 60 sec in step S102, the white reference sheet is read in step S103. The control then waits for an original reading command in step S104. Upon reception of the reading command, the carriage is moved to read an original image in step S105. Thereafter, the carriage is returned to its home position, and the control waits for the next reading command in step S104. During this interval, the low current is supplied to the LEDs in step S106 to set them in the heating mode. Steps S104 to S106 are repeated until a termination command is received in step S107. Upon reception of the termination command, the processing ends.

In this embodiment, time (60 sec) is used for temperature control of the LED. Alternatively, a temperature sensor may be arranged in the vicinity of the LED light source in the scanner unit, and the temperature control may be performed based on the detection temperature.

As described above, according to the present invention, the original reading operation is inhibited during the unstable period of the light amount or wavelength upon rising immediately after the ON operation of the light source such as LEDs, thus preventing an image with poor quality from being read.

If no reading operation is performed after the light source is stabilized, a current lower than that required upon reading is supplied to the light source so as to maintain the stable state, i.e., to obtain constantly high image quality.

In particular, a stable image can be read under limited conditions that the circuits must be simplified and the consumption power must be suppressed due to dimensional limitations like in the built-in scanner unit of a note personal computer.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading system comprising:
   (a) a reading unit adapted to read an image, said reading unit being mounted on a control apparatus so as to be exchangeable with a built-in printer unit;
   (b) a light source for illuminating the image;
   (c) a power supply adapted to supply electric power to said light source; and
   (d) a controller adapted to control said power supply to supply electric power different in quantity from that required upon reading to said light source while said reading unit does not read the image.

2. A system according to claim 1, wherein said controller controls to switch between a preheating mode in which said power supply supplies preheating electric power to said light source and a heating mode in which said power supply supplies heating electric power to said light source.

3. A system according to claim 2, wherein said controller controls said power supply to supply the preheating electric power to said light source in the preheating mode during an interval from a timing immediately after an ON operation of said light source until a temperature due to heat generated by said light source reaches a predetermined state.

4. A system according to claim 3, further comprising a timer adapted to measure an elapse of a predetermined time from the ON operation of said light source, and wherein said controller controls said power supply to supply the preheating electric power to said light source until said timer measures the elapse of the predetermined time.

5. A system according to claim 3, further comprising a temperature detection unit, arranged in the vicinity of said light source, adapted to detect a temperature, and wherein said controller controls said power supply to supply the preheating electric power to said light source until said temperature detection unit detects a predetermined temperature.

6. A system according to claim 2, wherein said controller switches to the heating mode when said reading unit does not perform reading after the preheating mode is completed.

7. A system according to claim 2, wherein said power supply supplies electric power lower than that in the preheating mode to said light source in the heating mode.

8. A system according to claim 2, wherein said power supply intermittently supplies a current to said light source as the electric power required upon reading to said light source.

9. A system according to claim 1, wherein said light source comprises a light emitting diode (LED).

10. A system according to claim 9, wherein a plurality of LEDs equivalent to said LED are arranged.

11. A system according to claim 10, wherein said plurality of LEDs are connected in series with each other.

12. A system according to claim 1, wherein said reading unit comprises a charge coupled device (CCD) line sensor.

13. A system according to claim 1, further comprising an analog-to-digital (A/D) converter adapted to convert a signal read by said reading unit into a digital signal.

14. A system according to claim 1, further comprising a correction circuit adapted to perform shading correction of a signal read by said reading unit.

15. A system according to claim 1, further comprising an optical unit adapted to irradiate light emitted by said light source onto the image and guiding the light reflected by the image toward said reading unit.

16. A system according to claim 1, further comprising a mounting element adapted to mount said image reading unit so as to be reciprocally movable in the control apparatus.

17. A system according to claim 16, further comprising an output device adapted to output the image signal to the control apparatus via a printer interface.

18. A system according to claim 1, further comprising an output device adapted to output the image signal to the control apparatus.

19. A control apparatus comprising a power supply adapted to supply electric power to a light source of an image reading apparatus having a reading unit adapted to read an image and a light source for illuminating the image, and a controller adapted to control said power supply to supply electric power different in quantity from that required upon reading to said light source while said reading unit does not read the image, wherein said image reading apparatus is mounted on the control apparatus so as to be exchangeable with a built-in printer unit.

20. An apparatus according to claim 19, wherein said controller controls to switch between a preheating mode in which said power supply supplies preheating electric power to said light source and a heating mode in which said power supply supplies heating electric power to said light source.

21. An apparatus according to claim 20, wherein said controller controls said power supply to supply the preheating electric power to said light source in the preheating mode during an interval from a time immediately after an ON operation of said light source until a temperature due to heat generated by said light source reaches a predetermined state.

22. An apparatus according to claim 21, further comprising a timer adapted to measure an elapse of a predetermined time from the ON operation of said light source, and wherein said controller controls said power supply to supply the preheating electric power to said light source until said timer measures the elapse of the predetermined time.

23. An apparatus according to claim 21, further comprising a temperature detection unit, arranged in the vicinity of said light source, adapted to detect a temperature, and wherein said controller controls said power supply to supply the preheating electric power to said light source until said temperature detection unit detects a predetermined temperature.

24. An apparatus according to claim 20, wherein said controller switches to the heating mode when said reading unit does not perform reading after the preheating mode is completed.

25. An apparatus according to claim 20, wherein said power supply supplies electric power lower than that in the preheating mode to said light source in the heating mode.

26. An apparatus according to claim 20, wherein said power supply intermittently supplies a current to said light source as the electric power required upon reading to said light source.

27. An apparatus according to claim 19, wherein said light source comprises a light emitting diode (LED).

28. An apparatus according to claim 27, wherein a plurality of LEDs equivalent to said LED are arranged.

29. An apparatus according to claim 28, wherein said plurality of LEDs are connected in series with each other.

30. An apparatus according to claim 19, wherein said reading unit comprises a charge coupled device (CCD) line sensor.

31. An apparatus according to claim 19, further comprising an analog-to-digital (A/D) converter adapted to convert a signal read by said reading unit into a digital signal.

32. An apparatus according to claim 19, further comprising a correction circuit adapted to perform shading correction of a signal read by said reading unit.

33. An apparatus according to claim 19, further comprising an optical unit adapted to irradiate light emitted by said light source onto the image and guiding the light reflected by the image toward said reading unit.

34. An apparatus according to claim 19, further comprising a mounting element adapted to mount said image reading unit so as to be reciprocally movable in said control apparatus.

35. An apparatus according to claim 34, further comprising an output device adapted to output the image signal to said control apparatus via a printer interface.

36. An apparatus according to claim 19, further comprising an output device adapted to output the image signal to said control apparatus.

37. An image reading system comprising:
    (a) a reading unit adapted to read an image;
    (b) a light source for illuminating the image; and
    (c) a power supply adapted to supply first electric power to said light source during an interval from a time after an ON operation of said light source until a predetermined state, and for supplying second electric power to said light source while said reading unit does not read the image,
    wherein said second electric power is lower than that required upon reading to said light source and said second electric power is lower than said first electric power.

38. A system according to claim 37, further comprising a timer adapted to measure an elapse of a predetermined time from the ON operation of said light source, wherein said power supply supplies the first electric power to said light source until said timer measures the elapse of the predetermined time.

39. A system according to claim 37, further comprising a temperature detection unit arranged in the vicinity of said light source, adapted to detect a temperature, and wherein said power supply supplies the first electric power to said light source until said temperature detection unit detects a predetermined temperature.

40. A system according to claim 37, wherein said power supply intermittently supplies a current to said light source as the electric power required upon reading to said light source.

41. A system according to claim 37, wherein said light source comprises a light emitting diode (LED).

42. A system according to claim 41, wherein a plurality of LEDs equivalent to said LED are arranged.

43. A system according to claim 42, wherein said plurality of LEDs are connected in series with each other.

44. A system according to claim 37, wherein said reading unit comprises a charge coupled device (CCD) line sensor.

45. A system according to claim 37, further comprising an analog-to-digital (A/D) converter adapted to convert a signal read by said reading unit into a digital signal.

46. A system according to claim 37, further comprising a correction circuit adapted to perform shading correction of a signal read by said reading unit.

47. A system according to claim 37, further comprising an optical unit adapted to irradiate light emitted by said light source onto the image and guiding the light reflected by the image toward said reading unit.

48. A system according to claim 37, wherein said reading unit is built in a control apparatus.

49. A system according to claim 48, wherein said reading unit is mounted on the control apparatus so as to be exchangeable with a built-in printer unit.

50. A system according to claim 48, further comprising a mounting element adapted to mount said image reading system so as to be reciprocally movable in the control apparatus.

51. A system according to claim 50, further comprising an output device adapted to output the image signal to the control apparatus via a printer interface.

52. A system according to claim 48, further comprising an output device adapted to output the image signal to the control apparatus.

53. An apparatus according to claim 48, wherein said light source comprises a light emitting diode (LED).

54. An apparatus according to claim 53, wherein a plurality of LEDs equivalent to said LED are arranged.

55. An apparatus according to claim 54, wherein said plurality of LEDs are connected in series with each other.

56. A control apparatus comprising a power supply adapted to supply electric power to a light source of an image reading apparatus having a reading unit adapted to read an image and a light source for illuminating the image, wherein said power supply supplies first electric power to said light source during an interval from a time after an ON operation of said light source until a predetermined state, and supplies second electric power to said light source while said reading unit does not read the image, wherein said second electric power is lower than that required upon reading to said light source and said second electric power is lower than said first electric power.

57. An apparatus according to claim 56, further comprising a timer adapted to measure an elapse of a predetermined time from the ON operation of said light source, wherein said power supply supplies the first electric power to said light source until said timer measures the elapse of the predetermined time.

58. An apparatus according to claim 56, further comprising a temperature detection unit, arranged in the vicinity of said light source, adapted to detect a temperature, and wherein said power supply supplies the first electric power to said light source until said temperature detection unit detects a predetermined temperature.

59. An apparatus according to claim 56, wherein said power supply intermittently supplies a current to said light source as the electric power required upon reading to said light source.

60. An apparatus according to claim 56, wherein said reading unit comprises a charge coupled device (CCD) line sensor.

61. An apparatus according to claim 56, further comprising an analog-to-digital (A/D) converter adapted to convert a signal read by said reading unit into a digital signal.

62. An apparatus according to claim 56, further comprising a correction circuit adapted to perform shading correction of a signal read by said reading unit.

63. An apparatus according to claim 56, further comprising an optical unit adapted to irradiate light emitted by said light source onto the image and guiding the light reflected by the image toward said reading unit.

64. An apparatus according to claim 56, wherein said image reading apparatus is built in said control apparatus.

65. An apparatus according to claim 64, wherein said image reading apparatus is mounted on the control apparatus so as to be exchangeable with a built-in printer unit.

66. An apparatus according to claim 64, further comprising a mounting element adapted to mount said image reading apparatus so as to be reciprocally movable in said control apparatus.

67. An apparatus according to claim 66, further comprising an output device adapted to output the image signal to said control apparatus via a printer interface.

68. An apparatus according to claim 64, further comprising an output device adapted to output the image signal to said control apparatus.

69. An image reading system comprising:
(a) a reading unit adapted to read an image;
(b) a light source for illuminating the image; and
(c) a power supply adapted to supply heating electric power to said light source during a time period from a time when a reference member is read to correct an image signal to a time when said reading unit receives a reading start signal for reading the image,
wherein an average of the heating electric power supplied in said time period is substantially equal to an average of electric power supplied to said light source during reading of the reference member.

70. A system according to claim 69, wherein said power supply intermittently supplies a current to said light source as the electric power required upon reading to said light source.

71. A system according to claim 69, wherein the reference member is read to perform shading correction on a signal read by said reading unit.

72. A system according to claim 69, wherein said reading unit is built in a control apparatus.

73. A system according to claim 72, further comprising an output device adapted to output the image signal to the control apparatus.

74. A control apparatus comprising a power supply adapted to supply electric power to a light source of an image reading apparatus having a reading unit adapted to read an image and a light source for illuminating the image, wherein said power supply supplies heating electric power during a time period from a time when a reference member is read to correct an image signal to a time when said reading unit receives a reading start signal for reading the image, and wherein an average of the heating electric power supplied in said time period is substantially equal to electric power supplied to said light source during reading of the reference member.

75. An apparatus according to claim 74, wherein said power supply intermittently supplies a current to said light source as the electric power required upon reading to said light source.

76. An apparatus according to claim 74, wherein the reference member is read to perform shading correction of a signal read by said reading unit.

77. An apparatus according to claim 74, wherein said reading unit is built in a control apparatus.

78. An apparatus according to claim 77, further comprising an output device adapted to output the image signal to the control apparatus.

79. An image reading system comprising:
(a) a reading unit adapted to read an image;
(b) a light source for illuminating the image; and
(c) a power supply adapted to supply heating electric power to said light source during a time period in which said reading unit does not perform reading of the image, at a period longer than that at which electric power is supplied to said light source during a time period in which said reading unit reads the image,
wherein an average of the heating electric power supplied in the time period in which said reading unit does not perform reading of the image is substantially equal to an average of the electric power supplied to said light source during the time period in which said reading unit reads the image.

80. A system according to claim 79, wherein said power supply intermittently supplies a current to said light source as the electric power required upon reading to said light source.

81. A system according to claim 79, wherein said reading unit reads a reference member to perform shading correction on an image signal read by said reading unit.

82. A system according to claim 79, wherein said reading unit is built in a control apparatus.

83. A system according to claim 82, further comprising an output device adapted to output the image signal to the control apparatus.

84. A control apparatus comprising a power supply adapted to supply electric power to a light source of an image reading apparatus having a reading unit adapted to read an image and a light source for illuminating the image, wherein said power supply supplies heating electric power to said light source during a time period in which said reading unit does not perform reading of the image, at a period longer than that at which electric power is supplied to said light source during a time period in which said reading unit reads the image, and wherein an average of the heating electric power supplied in the time period in which said reading unit does not perform reading of the image is substantially equal to an average of the electric power supplied to said light source during the time period in which said reading unit reads the image.

85. An apparatus according to claim 79, wherein said power supply intermittently supplies a current to said light source as the electric power required upon reading to said light source.

86. An apparatus according to claim 80, wherein said reading unit reads a reference member to perform shading correction on an image signal read by said reading unit.

87. A system according to claim 81, wherein said reading unit is built in a control apparatus.

88. A system according to claim 82, further comprising an output device adapted to output the image signal to the control apparatus.

* * * * *

UNITED STATES PATENT AND TRADEMARK OFFICE
CERTIFICATE OF CORRECTION

PATENT NO.    : 6,337,750 B1
DATED         : January 8, 2002
INVENTOR(S)   : Shigeru Mizoguchi Page 1 of 1

It is certified that error appears in the above-identified patent and that said Letters Patent is hereby corrected as shown below:

Column 2,
Line 4, "according" should read -- according to --.

Column 5,
Line 20, "(S1"Low"," should read -- (S1="Low", --.

Column 9,
Lines 6, 8 and 10, "An apparatus" should read -- A system --.

Column 12,
Line 5, "claim 79," should read -- claim 84, --;
Line 9, "claim 80," should read -- claim 84, --;
Line 12, "claim 81," should read -- claim 84, --; and
Line 14, "claim 82," should read -- claim 87, --.

Signed and Sealed this

Sixteenth Day of July, 2002

Attest:

JAMES E. ROGAN
Attesting Officer     Director of the United States Patent and Trademark Office